US012587378B2

(12) United States Patent
Brid et al.

(10) Patent No.: US 12,587,378 B2
(45) Date of Patent: Mar. 24, 2026

(54) METHOD AND SYSTEM FOR SECURELY ACCESSING METAVERSE PREMISES USING NON-FUNGIBLE TOKENS (NFTS)

(71) Applicant: HCL Technologies Limited, New Delhi (IN)

(72) Inventors: Devendra Brid, Navi Mumbai (IN); Arvind Maurya, Noida (IN)

(73) Assignee: HCL Technologies Limited, New Delhi (IN)

( * ) Notice: Subject to any disclaimer, the term of this patent is extended or adjusted under 35 U.S.C. 154(b) by 270 days.

(21) Appl. No.: 18/116,860

(22) Filed: Mar. 3, 2023

(65) Prior Publication Data

US 2024/0187235 A1     Jun. 6, 2024

(30) Foreign Application Priority Data

Dec. 6, 2022     (IN) ............................. 202211070262

(51) Int. Cl.
| | |
|---|---|
| *H04L 9/08* | (2006.01) |
| *G06T 13/40* | (2011.01) |
| *H04L 9/30* | (2006.01) |
| *H04L 9/32* | (2006.01) |

(52) U.S. Cl.
CPC ............ *H04L 9/3213* (2013.01); *G06T 13/40* (2013.01); *H04L 9/30* (2013.01); *H04L 2209/60* (2013.01)

(58) Field of Classification Search
CPC ..... H04L 9/3213; H04L 9/30; H04L 2209/60; G06T 13/40
USPC ............................................................ 726/9
See application file for complete search history.

(56) References Cited

U.S. PATENT DOCUMENTS

| | | | |
|---|---|---|---|
| 8,132,235 B2 | 3/2012 | Bussani et al. | |
| 10,639,551 B2 | 5/2020 | Hamilton, II et al. | |
| 11,075,891 B1 | 7/2021 | Long et al. | |
| 12,081,837 B2 * | 9/2024 | Silverstein | ......... G06Q 30/0201 |
| 2009/0172822 A1 * | 7/2009 | Sahita | ................... G06F 21/575 |
| | | | 726/26 |

(Continued)

OTHER PUBLICATIONS

Alan Rea, Security in Virtual Worlds, 3D Webs, and Immersive Environments, Models for Development, Interaction, and Management, Western Michigan University, USA, pp. 40, Published in the United States of America by Information Science Reference (an imprint of IGI Global).
Yogesh K. Dwivedi et al. Metaverse beyond the hype: Multidisciplinary perspectives on emerging challenges, opportunities, and agenda for research, practice and policy, Available online Jul. 16, 2022, Version of Record Jul. 16, 2022, International Journal of Information Management vol. 66, Oct. 2022, 102542,@ 2022 The Author(s). Published by Elsevier Ltd.

(Continued)

*Primary Examiner* — Sharon S Lynch
*Assistant Examiner* — Pegah Barzegar
(74) *Attorney, Agent, or Firm* — Kendal M. Sheets

(57) ABSTRACT

A method for securing metaverse premises using Non-Fungible Tokens (NFTs), is disclosed. In some embodiments, the method includes receiving an access request corresponding to at least one of a plurality of premises, from an avatar of a user. The method further includes retrieving the metadata associated with the avatar of the user based on the NFT, upon receiving the access request. The method further includes validating the access request received from the avatar based on the metadata. The method to validate further includes scanning the metadata associated with the avatar to verify information associated with the avatar based on the NFT. The method further includes providing an access of the at least one of the plurality of premises to the avatar upon validating the access request.

13 Claims, 9 Drawing Sheets

(56)          References Cited

U.S. PATENT DOCUMENTS

| 2010/0229235 | A1  |    | 9/2010  | Dawson et al. |             |
|--------------|-----|----|---------|---------------|-------------|
| 2012/0030733 | A1  |    | 2/2012  | Andrews et al. |            |
| 2020/0184547 | A1  | *  | 6/2020  | Andon         | G06Q 30/0209 |
| 2022/0318852 | A1  | *  | 10/2022 | Blaikie, III  | G06Q 30/0255 |
| 2022/0391887 | A1  | *  | 12/2022 | Jakobsson     | H04L 9/3239 |
| 2023/0281937 | A1  | *  | 9/2023  | Liu           | H04L 67/10  |
| 2023/0379159 | A1  | *  | 11/2023 | Singh         | H04L 9/50   |
| 2023/0412393 | A1  | *  | 12/2023 | Williams      | H04L 9/3221 |
| 2023/0419285 | A1  | *  | 12/2023 | Williams      | G06Q 30/06  |
| 2024/0070653 | A1  | *  | 2/2024  | Cho           | H04L 9/50   |
| 2024/0100444 | A1  | *  | 3/2024  | Samarthyam    | A63F 13/792 |
| 2024/0187235 | A1  | *  | 6/2024  | Brid          | H04L 9/30   |
| 2024/0273518 | A1  | *  | 8/2024  | Eby           | G06Q 20/3674 |

OTHER PUBLICATIONS

L Badri Narayananhemant Krishna, Protecting intellectual property in Metaverse, May 12, 2022, Copyright@ 2023, Thg Publishing PVT Ltd., https://www.thehindubusinessline.com/opinion/protecting-intellectual-property-in-metaverse/article65408301.ece.

Vishal Salvi, Securing the metaverse: 3 critical concepts, Mar. 26, 2022, https://venturebeat.com/datadecisionmakers/securing-the-metaverse-3-critical-concepts.

Yuntao Wang et al., A Survey on Metaverse: Fundamentals, Security, and Privacy, arXiv:2203.02662v4 [cs.CR] Sep. 9, 2022, pp. 32, https://arxiv.org/pdf/2203.02662.pdf.

* cited by examiner

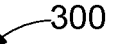
300

Assign the NFT to the avatar of the user 302

Prompt the user to import the avatar 304

Define the type of access rights for the avatar of the user to access the one or more premises 306

Create the metadata 308

Encrypt the metadata created for the avatar 310

Embedded the metadata into the avatar of the user 312

Assign the NFT to the avatar 314

Store the NFT assigned for the avatar and the metadata associated with the avatar 316

Continuously monitor the at least one of the
plurality of premise 602

Control movement of the avatar in the one or more zones
within the at least one of the plurality of premises 604

METHOD AND SYSTEM FOR SECURLY ACCESSING METAVERSE PREMISES USING NON-FUNGIBLE TOKENS (NFTS)

TECHNICAL FIELD

Generally, the invention relates to metaverse. More specifically, the invention relates to method and system for securing metaverse premises using Non-Fungible Tokens (NFTs).

BACKGROUND

Metaverse is a two-dimensional or three-dimensional virtual world incorporating augmented and virtual reality which typically are decentralized, store information on blockchain, and allow people to own digital premises such as houses, land parcels, restaurants, or supermarkets. In other words, the metaverse can be defined as a digital place where people traverse a virtual world that mimics aspects of physical world using technologies such as virtual reality (VR), augmented reality (AR), Artificial Intelligence (AI), social media and digital currency. In metaverse, an avatar is a digital twin of a real-world person. The user can access the premises within the metaverse via his avatar.

Currently, the avatar's entry in the metaverse can be controlled by using authentication mechanisms, such as, two factor authentications, single sign-on, etc. However, once the user enters in the metaverse via the avatar, controlling movement of the avatar within the metaverse becomes difficult. This is because, once the avatar of the user is authenticated to enter into the metaverse using the currently existing authentication mechanism, the avatar can roam freely and could travel to premises owned by other users within the metaverse without their consent. This could pose a problem for a user who owns a digital premise, e.g., a house or a land, or is hosting a concert or an event inside the premises owned by them, as the user cannot restrict the avatar of other users from accessing the owned premises. Moreover, without authorization of avatars to enter the premises, the owners of the premises or performers in the events held within the metaverse may end up losing potential revenue in form of rent, ticket sales, or could even have trouble in peacefully enjoying their own premises or the event within their own premises.

Therefore, there is a need of implementing an efficient and reliable technique for securing metaverse premises using Non-Fungible Tokens (NFTs).

SUMMARY OF INVENTION

In one embodiment, a method of securing metaverse premises using Non-Fungible Tokens (NFTs) is disclosed. The method may include receiving an access request corresponding to at least one of a plurality of premises, from an avatar of a user. It should be noted that, a Non-Fungible Token (NFT) may be pre-assigned to the avatar. It should be noted that, the NFT may comprises a metadata associated with the avatar, and the metadata may comprise an encrypted NFT public key associated with the avatar. The method may include retrieving the metadata associated with the avatar of the user based on the NFT, upon receiving the access request. The method may include validating the access request received from the avatar based on the metadata. To validate the access request, the method may include scanning the metadata associated with the avatar to verify information associated with the avatar based on the NFT.

The method may include providing an access of the at least one of the plurality of premises to the avatar upon validating the access request based on a type of access rights permitted to the avatar for the at least one of the plurality of premises.

In another embodiment, a system for securing metaverse premises using Non-Fungible Tokens (NFTs) is disclosed. The system includes a processor and a memory communicatively coupled to the processor. The memory may store processor-executable instructions, which, on execution, may cause the processor to receive an access request corresponding to at least one of a plurality of premises, from an avatar of a user. It should be noted that, a Non-Fungible Token (NFT) may be pre-assigned to the avatar. The NFT may comprise a metadata associated with the avatar, and the metadata may comprise an encrypted NFT public key associated with the avatar. The processor-executable instructions, on execution, may further cause the processor to retrieve the metadata associated with the avatar of the user based on the NFT, upon receiving the access request. The processor-executable instructions, on execution, may further cause the processor to validate the access request received from the avatar based on the metadata. To validate the access request, the processor-executable instructions, on execution, may further cause the processor to scan the metadata associated with the avatar to verify information associated with the avatar based on the NFT. The processor-executable instructions, on execution, may further cause the processor to provide an access of the at least one of the plurality of premises to the avatar upon validating the access request based on a type of access rights permitted to the avatar for the at least one of the plurality of premises.

In yet another embodiment, a non-transitory computer-readable medium storing computer-executable instruction for securing metaverse premises using Non-Fungible Tokens (NFTs) is disclosed. The stored instructions, when executed by a processor, may cause the processor to perform operations including receiving an access request corresponding to at least one of a plurality of premises, from an avatar of a user. It should be noted that, a Non-Fungible Token (NFT) may be pre-assigned to the avatar. The NFT may comprise a metadata associated with the avatar, and the metadata may comprise an encrypted NFT public key associated with the avatar. The operations may further include retrieving the metadata associated with the avatar of the user based on the NFT, upon receiving the access request. The operations may further include validating the access request received from the avatar based on the metadata. To validate the metadata, the operations may further include scanning the metadata associated with the avatar to verify information associated with the avatar based on the NFT. The operations may further include providing an access of the at least one of the plurality of premises to the avatar upon validating the access request based on a type of access rights permitted to the avatar for the at least one of the plurality of premises.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 3 illustrates a flowchart of a method for assigning an NFT to an avatar of a user, in accordance with an embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
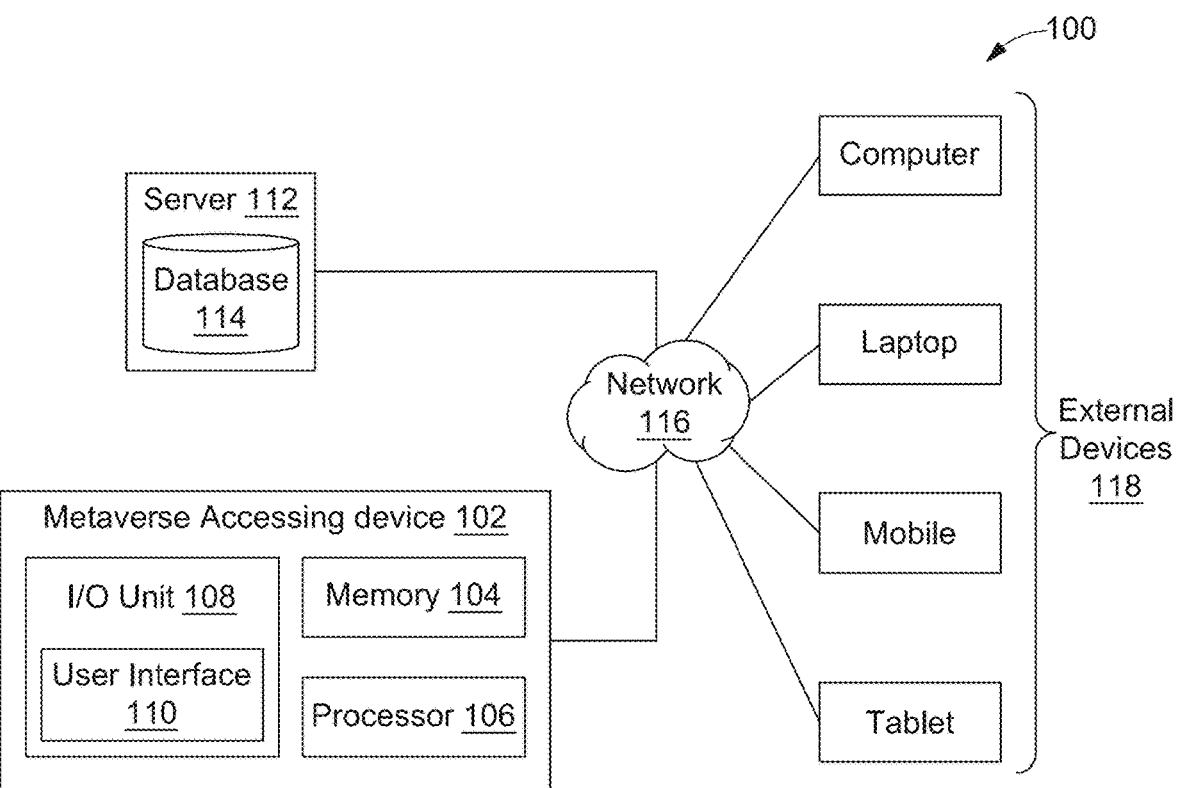
FIG. 1 illustrates a functional block diagram of a system configured for securing metaverse premises using Non-Fungible Tokens (NFTs), in accordance with an embodiment.

A functional block diagram of a system 100 configured for securing metaverse premises using Non-Fungible Tokens (NFTs) is illustrated in FIG. 1, in accordance with an embodiment. In order to secure a plurality of premises within a metaverse, the system 100 may include a metaverse accessing device 102. The metaverse accessing device 102 may be configured to assign an NFT to an avatar of a user. In an embodiment, each of the plurality of premises present within the metaverse may correspond to digital properties (e.g., buildings, land parcels, etc.) owned by the user in the metaverse. In addition, the user may be an individual or an organization owning one or more digital properties in the metaverse.

In order to assign the NFT to the avatar of the user, initially, the metaverse accessing device 102 may be configured to prompt the user to import the avatar. In an embodiment, the imported avatar may be used by the user to access one or more premises from the plurality of premises present within the metaverse. Once the user imports the avatar, the metaverse accessing device 102 may be configured to define a type of access rights for the avatar of the user to access the one or more premises. In an embodiment, the type of access rights may include, but is not limited to, a time-period allotted for accessing the at least one of the plurality of premises present within the metaverse, a time-period allotted for accessing one or more zones within the at least one of the plurality of premises, and a set of actions allowed to the avatar in the one or more zones.

Further, the metaverse accessing device 102 may create the metadata corresponding to the avatar of the user. The metadata may be created by associating the type of access rights with the one or more premises. Once the metadata for the avatar is created, the metaverse accessing device 102 may be configured to encrypt the metadata created for the avatar. The metadata may be encrypted by adding an encrypted NFT public key based on an encryption technique. Examples of the encryption techniques may include, but is not limited to, Advanced Encryption Standard (AES), Rivest-Shamir-Adleman (RSA), Triple Data Encryption Standard (DES), Blowfish, Twofish, Format-Preserving Encryption (FPE), Elliptic Curve Cryptography (ECC). Further, the metaverse accessing device 102 may be configured to embed the encrypted metadata into the avatar imported by the user.

Further, once the metadata is embedded into the avatar, the metaverse accessing device 102 may be configured to assign the NFT to the avatar using the avatar and the encrypted metadata associated with the avatar. The metaverse assigning device 102 may assign the NFT to the avatar, upon receiving an authentication from the user of the avatar for accessing one or more premises from the plurality of premises, and one or more zones within each of the one or more premises. Further, the metaverse accessing device 102 may store the NFT assigned for the avatar in an NFT wallet. In addition, the metaverse accessing device 102 may store the encrypted metadata created for the avatar in a database present within a memory 104 for future reference. It should be noted that, for ease of explanation the creation of the metadata and the assignment of the NFT is explained for the avatar of one user. However, in a similar manner the creation of the metadata and the assignment of the NFT may be done for an avatar imported by each of a plurality of users.

Once the NFT is assigned, then, in order to access at least one of the plurality of premises, the metaverse accessing device 102 may receive an access request corresponding to the at least one of the plurality of premises from the avatar of the user. It should be noted that, the NFT may be pre-assigned to the avatar of the user by the metaverse accessing device 102 as discussed above in present FIG. 1. The NFT may include the metadata associated with the avatar. In addition, the metadata may include the encrypted NFT public key associated with the avatar. Upon receiving the access request, the metaverse accessing device 102 may retrieve the metadata associated with the avatar of the user based on the NFT. Once the metadata is retrieved, the metaverse accessing device 102 may be configured to validate the access request received from the avatar based on the retrieved metadata.

In order to validate the access request, the metaverse accessing device 102 may scan the metadata associated with the avatar. In an embodiment, the metadata accessing device 102 may scan the metadata via a communicatively coupled metadata scanner. The metadata associated with the avatar may be scanned to verify information associated with the avatar based on the NFT. Further, based on the validation of the access request, when the access request is a valid request, then the metadata accessing device 102 may provide an access of the at least one of the plurality of premises to the avatar. In an embodiment, the access request may be validated based on the type of access rights permitted to the avatar for the at least one of the plurality of premises. Once the access of the at least one of the plurality of premises is provided to the avatar, the metaverse accessing device 102 may continuously monitor the at least one of the plurality of premises. The at least one of the plurality of premises is continuously monitored to prohibit the avatar from performing unauthorized actions or accessing a set of unauthorized zones present within the at least one of the plurality of premises.

Examples of the metaverse accessing device 102 may include, but is not limited to, a mobile phone, a laptop, a desktop, or a PDA, an application server, and so forth. The metaverse accessing device 102 may further include a memory 104, a processor 106, and an Input/Output unit 108. The I/O unit 108 may further include the user interface 110. A user or an administrator may interact with the electronic device 102 and vice versa through the I/O unit 108.

The I/O unit 108 may be used to display results (i.e., the plurality of premises, the one or more zones within each of the plurality of premises, result of the access request validation (e.g., access granted, or access denied), the type of access rights associated with the avatar, etc.) based on actions performed by the metaverse accessing device 102, to the user of the avatar. The user interface 110 may be used by the user to provide inputs to the metaverse accessing device 102. Thus, for example, in some embodiment, the metaverse accessing device 102 may ingest an input that includes an access request for accessing the at least one of the plurality of premises. Further, in some another embodiment, the metaverse accessing device 102 may ingest an input that includes authentication details to authenticate the user of the avatar before assigning the NFT to the avatar. Further, for example, in some embodiments, the metaverse accessing device 102 may render intermediate results (e.g., the plurality of premises, the type of access rights associated with the avatar) or final results (e.g., result of the access request validation (e.g., access granted, or access denied), the at least one of the plurality of premises, the one or more zones within the at least one of the plurality of premises) to the user via the user interface 110.

The memory 104 may store instructions that, when executed by the processor 106, may cause the processor 106 to provide secure access of the metaverse premises to the avatar of the user. The processor 106 may provide secure access of the at least one of the plurality of premises based on the NFT pre-assigned to the avatar and the metadata associated with the avatar. As will be described in greater detail in conjunction with FIG. 2 to FIG. 10, in order to provide secure access, the processor 106 in conjunction with the memory 104 may perform various functions including receiving the access request, retrieving the metadata associated with the avatar of the user, validating the access request received from the avatar, scanning the metadata associated with the avatar, providing the access of the at least one of the plurality of premises to the avatar, etc.

The memory 104 may also store various data (e.g., the avatar imported by the user, the pre-assigned NFT of the avatar, the metadata associated with the avatar, the type of access rights permitted to the avatar, etc.) that may be captured, processed, and/or required by the metaverse accessing device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the metaverse accessing device 102 may interact with a server 112 or external devices 118 over a network 116 for sending and receiving various data. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the metaverse accessing device 102 may fetch information regarding the plurality of premises present within the metaverse from the server 112. In addition, the server 112 may provide information, such as, information about the plurality of premises, the set of zones present within each of the plurality of premises, events happening in the set of zones of each of the plurality of premises, etc. to the user. The server 112 may further include a database 114. By way of an example, the database 114 may store information regarding the plurality of premises, the set of zones present within each of the plurality of premises, events happening in the set of zones of each of the plurality of premises. The database 114 may be periodically updated based on creation on new premise within the metaverse, or a new event that may happen in future in one or more of the plurality of premises. Alternatively, the metaverse accessing device 102 may receive input from the user from one of the external devices 118. This complete process followed by the system 100 is further explained in detail in conjunction with FIG. 2 to FIG. 9.

Figure 2:
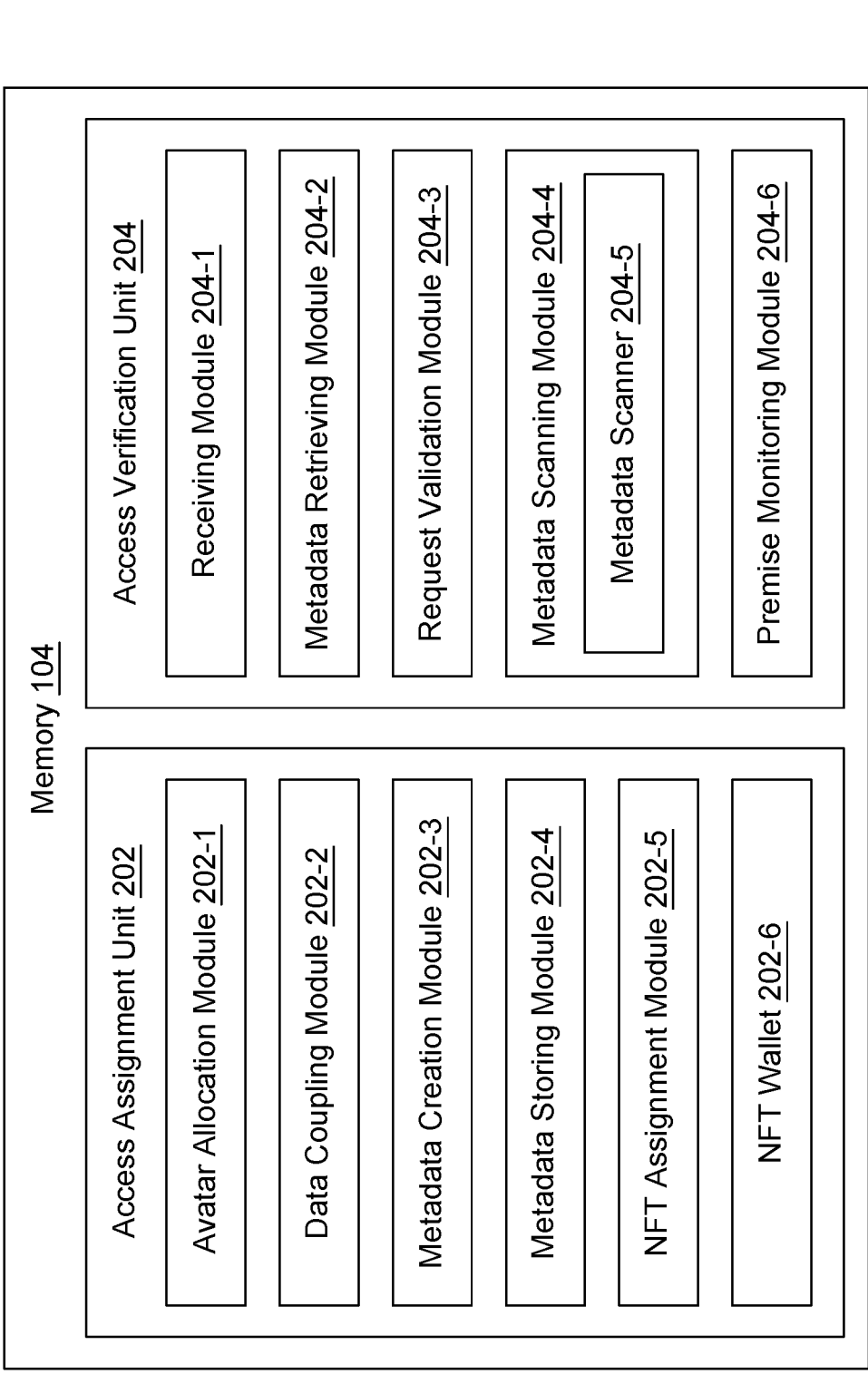
FIG. 2 illustrates a functional block diagram of various modules present within a memory configured for securing metaverse premises using NFTs, in accordance with an embodiment.

Referring now to FIG. 2, a functional block diagram of various modules stored within in a memory 104 configured for securing metaverse premises using NFTs is illustrated, in accordance with an embodiment. With reference to FIG. 1, the memory 104 may correspond to the memory 104 present within the metaverse accessing device 102. In order to secure metaverse premises using NFTs, the memory 104 may include an access assignment unit 202 and an access verification unit 204.

The access assignment unit 202 may be configured to assign the NFT the avatar of the user. In order to assign the NFT to the avatar of the user, the access assignment unit 202 may include an avatar allocation module 202-1, a data coupling module 202-2, a metadata creation module 202-3, a metadata storing module 202-4, an NFT assignment module 202-5, and an NFT wallet 202-6.

The access assignment unit 202 may assign the NFT to the avatar in order to allow the avatar to access the one or more of the plurality of premises using the assigned NFT. As will be appreciated, the access assignment unit 202 may assign the NFT to the avatar, upon receiving an authentication form the user of the avatar to access the one or more premises from the plurality of premises. In other words, the user may be required to pay a pre-defined payment amount to access the one or more premises.

By way of an example, when the user in interested in owning a premise, e.g., a house, within the metaverse, then the user may be required to pay the pre-defined payment amount of the house. By way of another example, when the user in interested in participating in an event (e.g., a sports event) happening in a premise from the plurality of premises, then in order to participate in the sports event, the user may be required to pay a pre-defined payment amount required for participating in the sports event.

In order to assign the NFT to the avatar, initially, the avatar allocation module 202-1 may be configured to prompt the user to import the avatar. The avatar imported by the user may be used by the user to access the one or more premises from the plurality of premises. As will be appreciated, the user may access the one or more premises, once the NFT is assigned to the avatar of the user. Further, when the user imports the avatar, the avatar allocation module 202-1 may be configured to send the avatar imported by the user to the data coupling module 202-2.

The data coupling module 202-2 may be configured to receive the avatar imported by the user from the avatar allocation module 202-1. Upon receiving the avatar imported by the user, the data coupling module 202-2 may be configured to retrieve information associated with the user. By way of an example, the data coupling module 202-2 may retrieve personal information, e.g., name, date of birth, email, etc., of the user by asking related questions to the user. Further, based on the authentication of the one or more premises by the user and the retrieved information, the data coupling module 202-2 may be configured to define the type of access rights for each of the one or more premises. In an embodiment, the type of access rights may include the time-period allotted for accessing the one or more premises, the time-period allotted for accessing one or more zones within the one or more premises, and the set of actions allowed to the avatar in the one or more zones.

Further, the metadata creation module 202-3 may be configured to the create the metadata for the avatar of the user. The metadata creation module 202-3 may create the metadata for the avatar by associating the types of access rights with the one or more premises. Further, the metadata creation module 202-3 may be configured to encrypt the metadata created for the avatar of the user. The metadata creation module 202-3 may encrypt the metadata by adding the encrypted NFT public key to the metadata. The encrypted NFT public key may be added to the metadata based on the encryption technique. Thereafter, the metadata creation module 202-3 may be configured to embed the encrypted metadata into the avatar imported by the user. Further, the metadata creation module 202-3 may store the encrypted metadata in a metadata storing module 202-4 for future reference. In other words, the metadata creation module 202-3 may store the encrypted metadata in the metadata storing module 202-4 to validate the access request received from the avatar for accessing the one or more premises.

Once the metadata is encrypted, the NFT assignment module 202-5 may be configured to assign the NFT to the avatar of the user. In an embodiment, the NFT may correspond to a unique token assigned to the avatar of the user. This assigned NFT may be used to verify the avatar of the user before providing an access of the one or more premises. Once the NFT is assigned to the avatar, the NFT assignment module 202-5 may store the NFT assigned to the avatar in an NFT wallet 202-6 of the user. In an embodiment, the NFT wallet 202-6 may correspond to a hardware wallet.

As will be appreciated, for ease of explanation the assignment of the NFT to the avatar of one user is explained in present FIG. 2. However, in a similar manner, the NFT may be assigned to the avatar associated with each of a plurality of users. Further, once the NFT is assigned by the access assignment unit 202 to the avatar imported by each of the plurality of users, then each of the plurality of user may access the one or more premises within the metaverse using the imported avatar and the NFT assigned to the avatar.

The access verification unit 204 may be configured to verify the access request received from the avatar of the user for access the at least one of the plurality of premises within the metaverse. In order to perform verification of the access request, the access verification unit 204 may include a receiving module 204-1, a metadata retrieving module 204-2, a request validation module 204-3, a metadata scanning module 204-4, and a premise monitoring module 204-6. The metadata scanning module 204-4 may further include a metadata scanner 204-5.

Initially, the receiving module 204-1 may be configured to receive the access request corresponding to the at least one of the plurality of premises. The access request may be received by the receiving module 204-1 from the avatar of the user. Further, the receiving module 204-1 may obtain information associated with the avatar from the access request. The information obtained from the access request may include user information, the avatar associated with the user, and the NFT pre-assigned to the avatar of the user. Further, the receiving module 204-1 may be configured to send the access request and the obtained information to the metadata retrieving module 204-2.

The metadata retrieving module 204-2 may be configured to retrieve the metadata associated with the avatar of the user. In an embodiment, the metadata associated with the avatar of the user may be retrieved based on the NFT pre-assigned to the avatar. The created metadata may be stored within the metadata storing module 202-4 of the access assignment unit 202. In order to retrieve the metadata associated with the avatar, the metadata retrieving module 204-2 may compare the pre-assigned NFT obtained from the access request with the NFT pre-stored in the metadata associated with the avatar. Further, the metadata retrieving module 204-2 may send the information obtained from the access request and the retrieved metadata to the request validation module 204-3.

The request validation module 204-3 may be configured to receive the information obtained from the access request and the retrieved metadata from the metadata retrieving module 204-2. Upon receiving the obtained information and the metadata, the request validation module 204-3 may be configured to validate the access request received from the avatar. In order to validate the access request, the request validation module 204-3 may send the retrieved metadata to the metadata scanning module 204-4. The metadata scanning module 204-4 may be configured to scan the access request to retrieve the information from the access request via the metadata scanner 204-5. The information obtained from the access request may include user information, the avatar associated with the user, and the NFT pre-assigned to the avatar. Further, the metadata scanning module 204-4 may be configured to download the pre-stored encrypted metadata associated with the avatar from the metadata storing module 202-4. Upon downloading, the pre-stored encrypted metadata may be scanned via the metadata scanner 204-5. In an embodiment, the metadata scanner may correspond to a virtual metadata scanner. Further, the metadata scanning module 204-4 may be configured to send the obtained information and the information pre-stored in the metadata to the request validation module 204-3.

The request validation module 204-3 may validate the access request by comparing the information obtained from the access request with the information pre-stored in the metadata associated with the avatar. Based on the comparison, when the access request is validated, the request validation module 204-3 may provide the access of the at least one of the plurality of premises to the avatar. The access of the at least one of the plurality of premises may be provided to the avatar based on the type of access rights permitted to the avatar for the at least one of the plurality of premises. In some embodiment, based on the comparison of the information obtained from the access request with the information pre-stored in the metadata, when the access request is a non-valid request, then the request validation module 204-3 may revoke the access request received from the avatar.

Further, once the access of the at least one of the plurality of premises is provided to the avatar, the premise monitoring module 204-6 may be configured to continuously monitor the at least one of the plurality of premises. It should be noted that, apart from the at least one of the plurality of premises, the premise monitoring module 204-6 may continuously monitor each of the plurality of premises present with the metaverse. In an embodiment, the premise monitoring module 204-6 may continuously monitor each of the plurality of premises via the metadata scanner 204-5. In such embodiment, the metadata scanner 204-5 may be placed within each of the plurality of premise or at an entry of each of the plurality of premise.

Further, the premise monitoring module 204-6 may continuously monitor the at least one of the plurality of premises to prohibit the avatar from accessing the set of unauthorized zones present within the at least one of the plurality of premises. Moreover, the premise monitoring module 204-6 may control movement of the avatar in the one or more zones within the at least one of the plurality of premises. The movement of the avatar may be controlled based on the type of access rights assigned to the avatar.

Referring now to FIG. 3, a flowchart of a method 300 for assigning an NFT to an avatar of a user is illustrated, in accordance with an embodiment. In order to assign the NFT to the avatar as mentioned via the step 302, at step 304, the user may be prompted to import the avatar. In an embodiment, the imported avatar may be used by the user to access the one or more premises from the plurality of premises. Once the user imports the avatar, at step 306, the type of access rights may be defined for the avatar of the user. The type of access rights may be defined to provide access the one or more premises to the avatar based on the type of access rights. Upon defining the type of access rights, at step 308, the metadata may be created for the avatar of the user. In an embodiment, the metadata may be created by associating the type of access rights with the one or more premises.

Further, at step 310, the metadata created for the avatar may be encrypted. The encryption of the metadata may be done by adding the encrypted NFT public key based on the encryption technique. Examples of the encryption techniques may include, but is not limited, Advanced Encryption Standard (AES), Rivest-Shamir-Adleman (RSA), Triple Data Encryption Standard (DES), Blowfish, Twofish, Format-Preserving Encryption (FPE), Elliptic Curve Cryptography (ECC).

Once the metadata is encrypted, at step 312, the encrypted metadata may be embedded into the avatar imported by the user. Further, at step 314, the NFT may be assigned to the avatar of the user. In an embodiment, the NFT may be assigned using the avatar and the encrypted metadata associated with the avatar. Once the NFT is assigned to the avatar, at step 316, the assigned NFT and the metadata may be stored. In an embodiment, the NFT assigned to the avatar may be stored in an NFT wallet (same as the NFT wallet 202-6). In addition, the encrypted metadata associated with the avatar may be stored in a database. With reference to FIG. 2, the database may correspond to the metadata storing module 202-4.

In an embodiment, the NFT may be assigned to the avatar of the user upon receiving the authentication for the one or more premises from the plurality of premises, from the user of the avatar. By way of an example, the authentication may correspond to a payment received from the user of the avatar for purchasing the one or more premises. By way of another example, the authentication may correspond to a payment for purchasing a ticket for an event happening in one of the plurality of premises. Once the user of the avatar is authenticated for the one or more of the plurality of premises, the NFT may be assigned to the avatar of the user. Further based on the assigned NFT, the avatar of the user may send the access request to access the at least one of the one or more premises as per his requirement.

Figure 4:
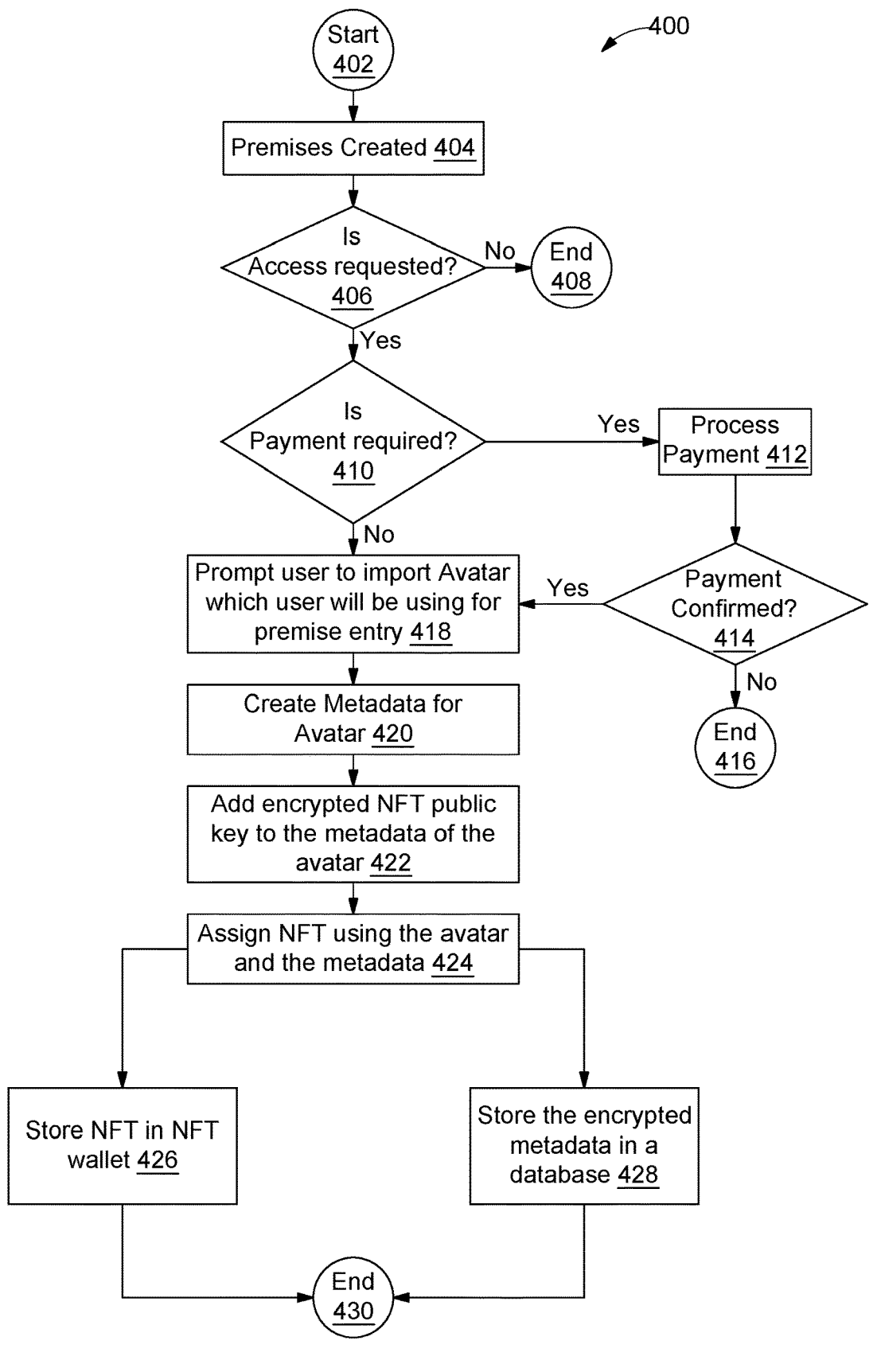
FIG. 4 illustrates a flow diagram of a detailed process for assigning an NFT to an avatar of a user, in accordance with an embodiment.

Referring now to FIG. 4, a flow diagram of a detailed process 400 for assigning an NFT to an avatar of a user is illustrated, in accordance with an embodiment. The process 400 to assign the NFT to the avatar of the user may start as mentioned via step 402. As the process 400 starts, at step 404, the plurality of premises may be created within the metaverse. In an embodiment, each of the plurality of premises may correspond to a digital property. Examples of the plurality of premises, may include commercial buildings, residential buildings, land parcels, event venues, and the like. Once the plurality of premises are created, at step 406, a check may be performed to identify whether the user has requested to access the one or more premises within the metaverse. Further, based on the check performed, when no access request was detected, then at step 408, the process 400 may end.

Furthermore, based on the check performed, when the access request was detected, then at step 410, a check may be performed to determine whether an authentication, i.e., a payment to access at least one of the one or more premises is required from the user of the avatar or not. In other words, the authentication may correspond to the payment required to access the one or more of the plurality of premises. In one embodiment, based on the check performed, when the payment may be required to access the one or more premises, then at step 412, the payment may be received from the user corresponding to the one or more premises. Further, the received payment may be processed as mentioned by the step 412.

Further, at step 414, a check may be performed to determine whether the processing of the payment corresponding to the one or more premises is confirmed or not. Based on the check performed, when the payment corresponding to the one or more premises is not confirmed, then at step 416, the process 400 may end. On the other hand, based on the check performed, when the payment corresponding to the one or more premises is confirmed, then step 418 may be executed.

In another embodiment, based on the check performed at step 410, when the payment is not required from the user, then the step 418 may be executed. At step 418, the user may be prompted to import the avatar which the user may be using for accessing the one or more of the plurality of premises. Once the user imports the avatar, then at step 420, the metadata may be created for the avatar of the user. In order to create the metadata, the type of access rights may be defined for the avatar to access each of the one or more premises. Once the type of access rights corresponding to each of the plurality of premises are defined, then the metadata may be created by associating the type of access rights with the one or more premises.

Further, at step 422, the encrypted NFT public key may be added to the metadata of the avatar. This is done to encrypt the metadata of the avatar of the user. Once the metadata is encrypted, the encrypted metadata may be embedded into the avatar of the user. Further, at step 424, the NFT may be assigned to the avatar. In an embodiment, the NFT may be assigned using the avatar and the encrypted metadata associated with the avatar. Upon assigning the NFT, at step 426, the NFT assigned to the avatar may be stored in the NFT wallet of the user. In addition, once the NFT is assigned to the avatar, at step 428, the encrypted metadata associated with avatar may be stored in the database. With reference to FIG. 2, the database may correspond to the metadata storage module 202-4. Once the NFT is stored in the NFT wallet and the encrypted metadata is stored in the database, then at step 430, the process 400 may end.

Figure 5:
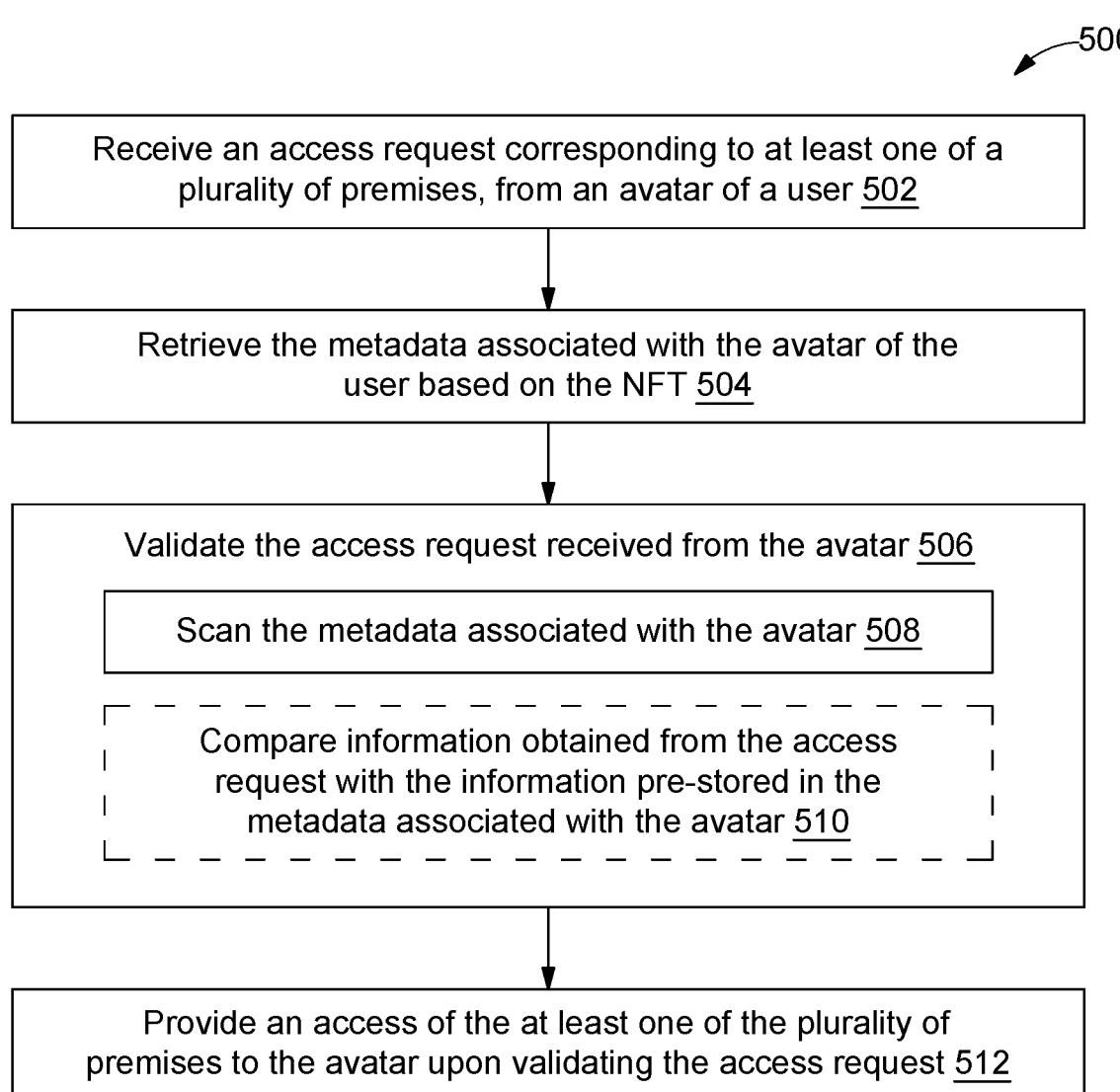
FIG. 5 illustrates a flowchart of a method for securing metaverse premises using NFTs, in accordance with an embodiment.

Referring now to FIG. 5, a flowchart of a method 500 for securing metaverse premises using NFTs is illustrated, in accordance with an embodiment. In order to provide secure access of the metaverse premises, initially, at step 502, an access request corresponding to at least one of a plurality of premises may be received from an avatar of a user. In an embodiment, each of the plurality of premises may correspond to digital properties (e.g., buildings, land parcels, etc.) owned by the user in the metaverse. Further, the user may be an individual or an organization owning one or more digital properties in the metaverse. The avatar may be a digital copy of a real-world identity of the user in the metaverse. In an embodiment, the NFT may be pre-assigned to the avatar. The NFT may include the metadata associated with the avatar. In addition, the metadata may include the encrypted NFT public key associated with the avatar. It should be noted that, the NFT may be pre-stored in the NFT wallet of the user. The metadata associated with the avatar may be mapped to the NFT in the database.

Upon receiving the access request, at step 504, the metadata associated with the avatar of the user may be retrieved from the database. In an embodiment, the metadata associated with the avatar may be retrieved based on the NFT pre-assigned to the avatar of the user. Once the metadata associated with the avatar is retrieved, at step 506, the access request received from the avatar may be validated based on the retrieved metadata. In order to validate the access request, at step 508, the metadata associated with the avatar may be scanned to verify information associated with the avatar based on the NFT. Further, in order to verify the information associated with the avatar, at step 510, information obtained from the access request may be compared with the information pre-stored in the metadata associated with the avatar. In an embodiment, the obtained information may include user information, the avatar associated with the user, and the NFT pre-assigned to the avatar. In an embodiment, the user information may include one or more premises from the plurality of premises owned by the avatar, the type of access rights defined for accessing the one or more premises owned by the avatar.

By way of an example, in order to validate the access request received from the avatar for accessing the at least one of the plurality of premises, initially, the user information obtained with the access request may be checked. For example, the validation may be made to verify whether the name of the user associated with the avatar is same as the name of the user pre-stored in the metadata corresponding to the avatar. Similarly, the verification may be made to identify whether the avatar owns the at least one of the plurality of premises by comparing the access request received for accessing the at least one of the plurality of premises with the one or more premises owned by the avatar that is pre-stored in the metadata. Further, the validation may be done to verify whether the avatar of the user from which the access request is received is same as the avatar of the user pre-stored in the metadata. This may be done by comparing the encrypted NFT public key associated with the avatar with an encrypted NFT public key pre-stored in the metadata associated with the avatar. Similarly, the validation of the access request may be done by comparing the pre-assigned NFT key received with the access request with the pre-assigned NFT key associated with the avatar that downloaded from the NFT wallet.

In one embodiment, upon validating the access request, at step 512, an access of the at least one of the plurality of premises may be provided to the avatar of the user. In an embodiment, the access of the at least one of the plurality of premises may be provided to the avatar based on the type of access rights permitted to the avatar for accessing the at least one of the plurality of premises. In an embodiment, the type of access rights may include the time-period allotted for accessing the at least one of the plurality of premises present within the metaverse, the time-period allotted for accessing the one or more zones within the at least one of the plurality of premises, and the set of actions allowed to the avatar in the one or more zones.

As will be appreciated, each of the one or more zones may correspond to a sub-premise present within each of the plurality of premises. By way of an example, when a premises is a commercial building (e.g., an office building), then the one or more zones may correspond to a reception and greeting area, meeting and conference rooms, work rooms, cafeterias, and the like. Further, the type of access rights for each of the one or more zones may be pre-defined during creation of the metadata for the avatar of the user. In another embodiment, during validation of the access request, when the access request of the avatar for accessing the at least one of the plurality of premise is not valid, then the access request for the at least one of the plurality of premises by the avatar may be denied. The method of providing the access of the at least one of the plurality of premises to the avatar of the user is further explained in detail in reference to FIG. 7 to FIG. 9.

Figure 6:
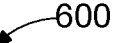
FIG. 6 illustrates a flowchart of a method of controlling movement of an avatar within at least one of a plurality of premises, in accordance with an embodiment.

Referring now to FIG. 6, a flowchart of a method 600 of controlling movement of an avatar within at least one of a plurality of premises present is illustrated, in accordance with an embodiment. With reference to FIG. 5, once the access of the at least one of the plurality of premises is provided to the avatar as mentioned via the step 512, then at step 602, the at least one of the plurality of premises may be continuously monitored. In an embodiment, the at least one of the plurality of premises may be continuously monitored to prohibit the avatar from accessing a set of unauthorized zones present within the at least one of the plurality of premises. Further, the at least one of the plurality of premises may be continuously monitored to control movement of the avatar in the one or more zones within the at least one of the plurality of premises as mentioned via a step 604. The movement of the avatar within the one or more zones may be controlled based on the type of access rights permitted to the avatar for accessing each of the one or more zones.

By way of an example, when a premise is the office building, and the avatar belongs to the user who is a visitor. In this case, the one or more zones that may be accessed by the avatar may include the reception and greeting area, the cafeteria, and washrooms. Further, the type of access rights defined for the avatar for accessing the one or more zones may be a time-period allotted for accessing the one or more zones, the set of actions allowed to the avatar within the one or more zones. For example, a time-period allotted for accessing the reception and greeting area, and the cafeteria may be of 30 minutes. Similarly, the set of actions allowed to the avatar within the reception and greeting area, and the cafeteria may include use of personal smartphones, ordering food and drinks from cafeteria, having meals within the cafeteria, and the like. Additionally, the set of unauthorized zones in which entry of the avatar may be prohibited may be for example, the meeting and conference rooms, the work rooms, and the like. This is further explained in reference to FIG. 9.

Figure 7:
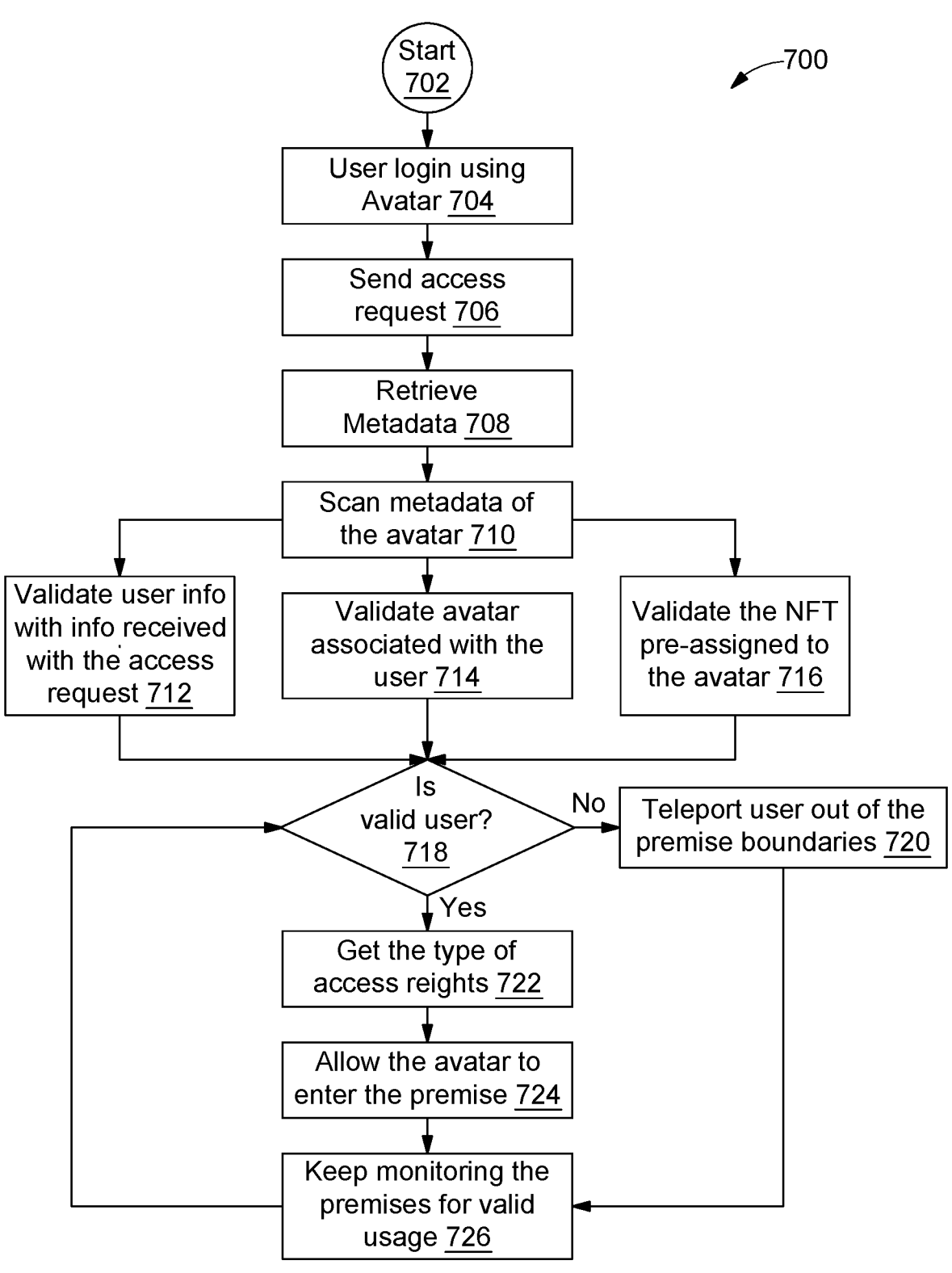
FIG. 7 illustrates a flow diagram of a detailed process for securely accessing metaverse premises by an avatar of a user, in accordance with an embodiment.

Referring now to FIG. 7, a flow diagram of a detailed process 700 for securely accessing metaverse premises by an avatar of a user is illustrated, in accordance with an embodiment. The process 700 may start at step 702. Once the process 700 starts at step 702, then at step 704, the user of the avatar may login in the metaverse using the avatar and associated login credentials (e.g., username and password). Once the user login using the associated avatar, then at step 706, the avatar of the user may send the access request for accessing the at least one of the plurality of premises. In other words, the user may send the access request using his avatar. In an embodiment, along with the access request the information associated with the avatar of the user may also be obtained from the access request. The obtained information may include user information, the avatar associated with the user, and the NFT pre-assigned to the avatar. Further, the NFT may include the metadata associated with the avatar. The metadata may include the encrypted NFT public key.

Upon receiving the access request, at step 708, the metadata associated with the avatar may be retrieved based on the associated pre-assigned NFT. Once the metadata is retrieved, at step 710, the metadata associated with the avatar may be scanned to verify the information associated with the avatar based on the NFT. In order to verify, the information obtained from the access request may be compared with the information pre-stored in the metadata associated with the avatar based on the NFT. The verification of the information associated with the avatar may be done to validate the access request received from the avatar.

In order to validate the access request, at step 712, the user information obtained with the access request may be compared with the information pre-stored in the metadata of the avatar. The comparison of the obtained information with the pre-stored information may be done based on the NFT pre-assigned to the avatar. Further, at step 714, the avatar of the user may be validated by comparing the avatar from which the access request is received with the avatar pre-stored in the metadata based on the NFT. In addition, at step 716, the encrypted NFT public key associated with the avatar obtained with access request may be compared with the encrypted NFT public key pre-stored in the metadata of the avatar based on the NFT.

Based on the comparison performed at step 712, 714, and 716, at step 718, a check may be performed to determine whether the user of the avatar is the valid user or not. In other words, the check may be performed to determine whether the avatar of the user is allowed to access the at least one of the plurality of premises for which the access request is received from the avatar. In one embodiment, based on the check performed, when the user is not the valid user, i.e., the access request received from the avatar of the user is not valid, then at step 720, the avatar of the user may be teleported out of boundaries of the at least one of the plurality of premises.

Once the avatar is teleported out of the boundaries of the at least one of the plurality of premises, step 726 may be executed. In another embodiment, based on the check performed at step 718, when the user is the valid user, i.e., the access request received from the avatar of the user is validated, then at step 722, the type of access rights permitted to the avatar of the user for the at least one of the plurality of premises may be obtained. In an embodiment, the type of access rights may include the time-period allotted for accessing the at least one of the plurality of premises present within the metaverse, the time-period allotted for accessing one or more zones within the at least one of the plurality of premises, and the set of actions allowed to the avatar in the one or more zones.

Further, at step 724, the avatar of the user may be allowed to enter the at least one of the plurality of premises. In other words, the access of the at least one of the plurality of premises may be provided to the avatar. As will be appreciated, the access may be provided to the avatar based on the type of access rights permitted to the avatar to access the at least one of the plurality of premises. Once the access is provided to the avatar, the step 726 may be executed. At step 726, each of the plurality of premises including the at least one of the plurality of premises may be continuously monitored for valid usage. In an embodiment, each of the plurality of premises may be continuously monitored to prohibit an avatar of any user from accessing unauthorized premises from the plurality of premises. Moreover, each of the plurality of premises may be continuously monitored to prohibit the avatar from accessing the set of unauthorized zones present within each of the plurality of premises. The continuous monitoring of the plurality of premises is done to control movement of the avatar of the user in the one or more zones of each of the plurality of premises. The movement of the avatar in the one or more zones within each of the plurality of premises may be controlled based on the type of access rights permitted to the avatar.

Figure 8:
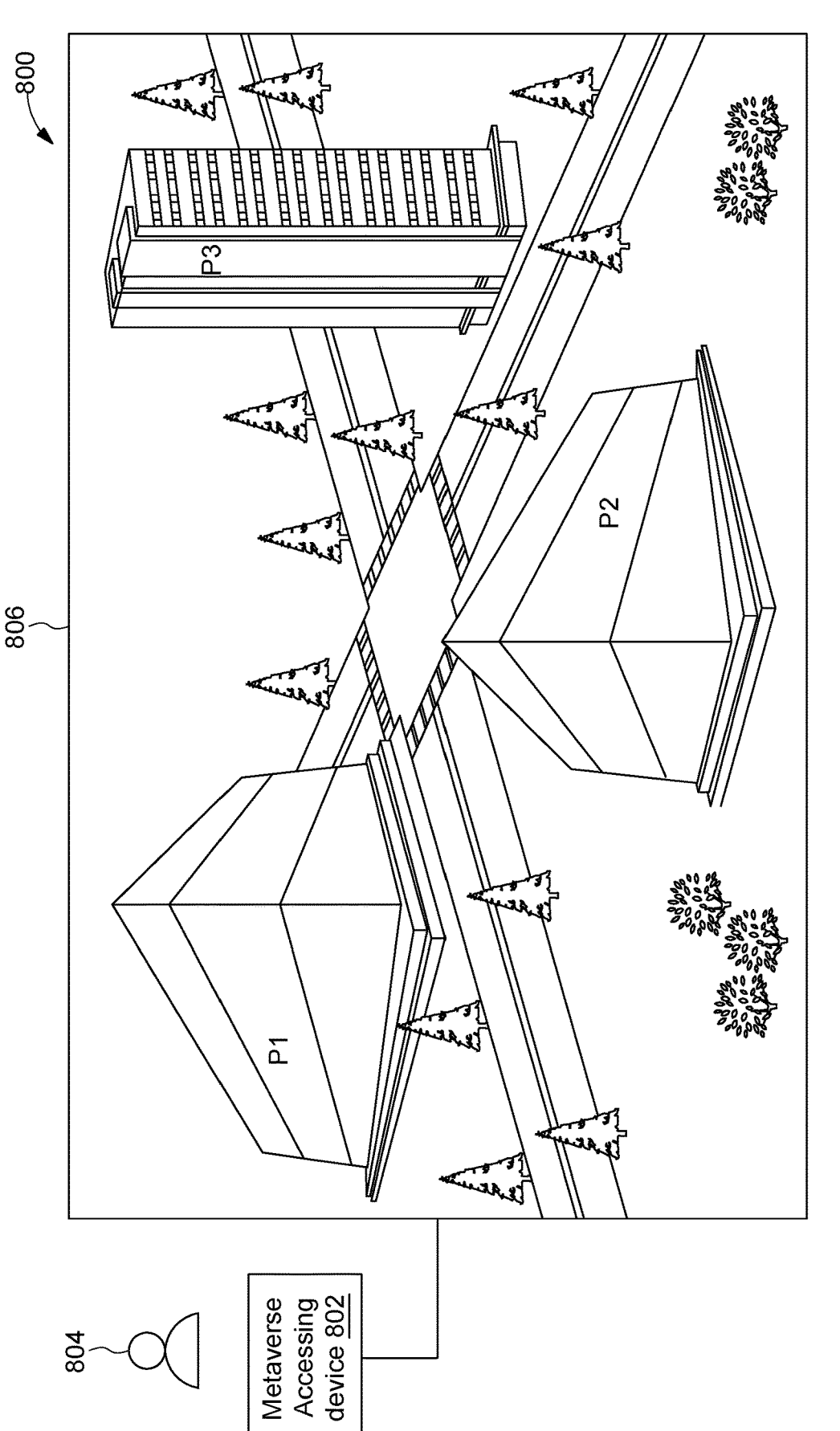
FIG. 8 is a pictorial representation of providing an access of at least one of a plurality of premises within a metaverse to an avatar of a user, in accordance with an exemplary embodiment.

Referring now to FIG. 8, a pictorial representation 800 of providing an access of at least one of a plurality of premises within a metaverse 806 to an avatar of a user 804 is illustrated, in accordance with an exemplary embodiment. As will be appreciated, FIG. 8 is explained in reference to FIG. 5. Initially, a metaverse accessing device 802 may receive the access request from the avatar of the user 804. With reference to FIG. 1, the metaverse accessing device 802 may correspond to the metaverse accessing device 102. The access request may be received for accessing the at least one of the plurality of premises present within the metaverse 806. As depicted via the present FIG. 8, the plurality of premises present within the metaverse 806 may correspond to a set of three premises. The set of three premises may be depicted as 'P1', 'P2', and 'P3'. Now suppose the access request received from the avatar of the user 804 may be associated with a premise 'P2'. In other words, the metaverse accessing device 802 may receive the access request from the avatar of the user 804 for accessing the premise 'P2'.

In an embodiment, the access request received from the avatar of the user 804 may include the NFT pre-assigned to the avatar. The pre-assigned NFT may include the metadata associated with the avatar of the user 804. With reference to FIG. 2, the access assignment unit 802 may create the metadata for the avatar of the user 804 while assigning the NFT to the avatar of the user 804. The assignment if the NFT to the avatar is done to register the avatar of the user 804 in the metaverse 806. The registering of the avatar in the metaverse 806 may be done after receiving the authentication for accessing the one or more premises (for example, 'P1' and 'P2') from the set of three premises from the user 804 of the avatar. Once the authentication for the premises 'P1' and 'P2' is received from the user 804, the metaverse accessing device 804 may create the metadata and assign the NFT to the avatar of the user 804. This is done to enable the avatar of the user 804 to access the one or more premises owned by the avatar after verifying the access request received from the avatar.

Upon receiving the access request, the metaverse accessing devise 802 may retrieve the metadata associated with the avatar of the user 804. The metadata associated with the avatar may be retrieved based on the pre-assigned NFT. Further, the metaverse accessing device 802 may validate the access request received from the avatar based on the retrieved metadata. In order to validate the access request, the metadata accessing device 802 may scan the metadata associated with the avatar. The metadata associated with the avatar may be scanned to verify information associated with the avatar. The information associated with the avatar may be verified based on the NFT. In order to verify the information associated with the avatar, the metaverse accessing device 802 may compare the information obtained from the access request of the avatar with the information pre-stored in the metadata corresponding to the avatar. The obtained information may include user information, the avatar associated with the user, and the NFT pre-assigned to the avatar.

Once the access request received from the avatar of the user 804 is validated, the metaverse accessing device 802 may provide the access of the at least one of the plurality of premises, i.e., the premise 'P2' to the avatar of the user 804. The access of the premise 'P2' may be provided to the avatar based on the type of access rights permitted to the avatar for the premise 'P2'. With reference to FIG. 2, the access assignment unit 202 may defined the type of access rights to access the one or more zones within the premise 'P2' for the avatar while creating the metadata for the avatar of the user 804. In an embodiment, the type of access rights may include the time-period allotted for accessing the premise 'P2' within the metaverse 806, the time-period allotted for accessing the one or more zones within the premise 'P2', and a set of actions allowed to the avatar in the one or more zones within the premise 'P2'.

Figure 9:
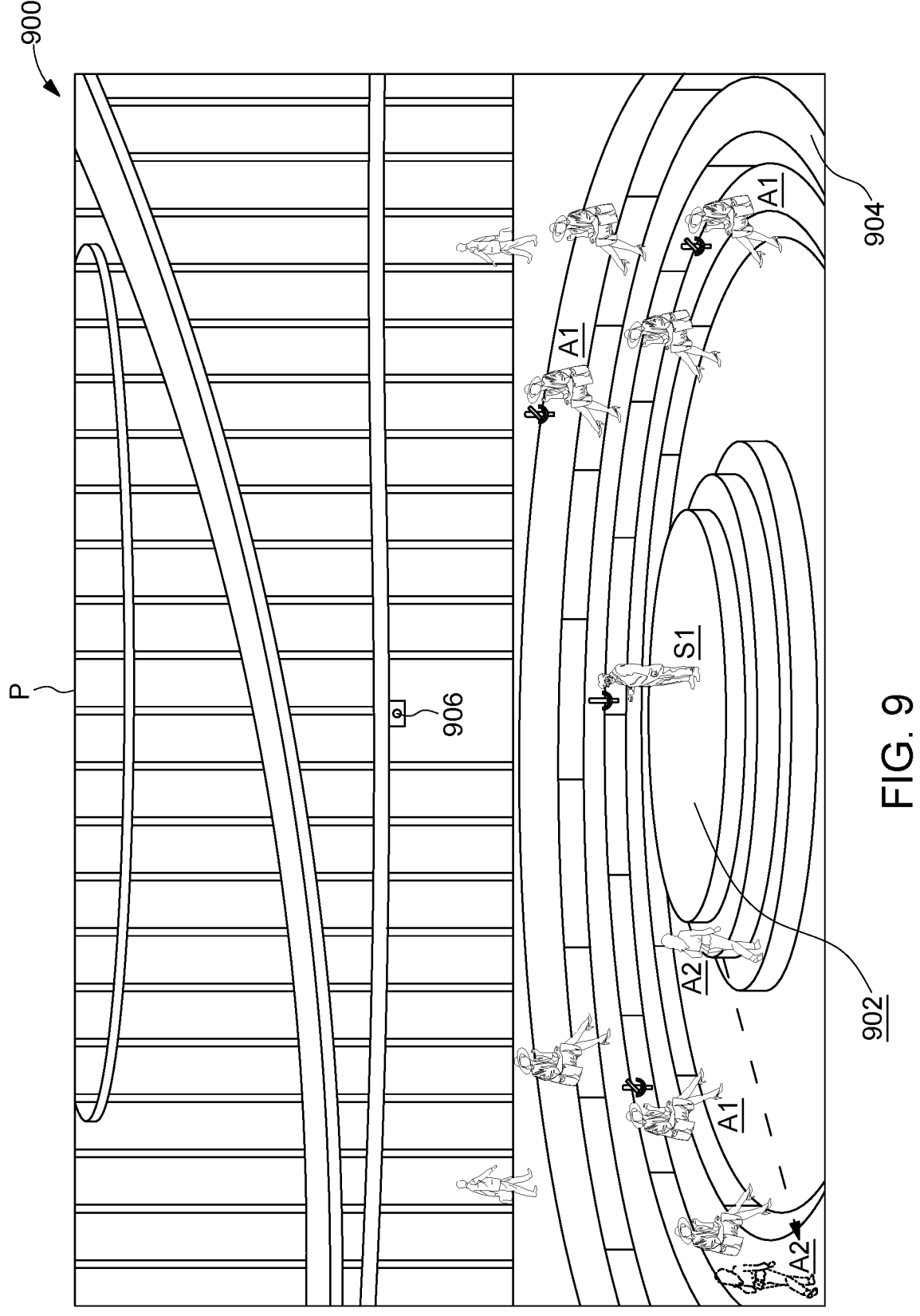
FIG. 9 is a pictorial representation of controlling movement and a set of actions of avatars within a premise, in accordance with an exemplary embodiment.

Referring now to FIG. 9, a pictorial representation 900 of controlling movement of avatars within a premise 'P' is illustrated, in accordance with an exemplary embodiment. As depicted via the present FIG. 9, the avatar associated with one or more users from the plurality of users may be permitted to access the premise 'P'. In an embodiment, the avatar of the one or more users may be permitted to access the premise 'P' upon validating the access request received from the avatar of each of the one or more users. Once the avatar of each of the one or more users is allowed to enter the premise 'P', the premise 'P' may be continuously monitored to prohibit the avatar of each of the one or more users from accessing the set of unauthorized zones within the premise 'P'. In an embodiment, the premise 'P' may be continuously monitored via the metadata scanner, i.e., a metadata scanner 906. Moreover, the premise 'P' is continuously monitored to control movement of the avatar of each of the one or more users within the one or more zones of the premise 'P'. The movement of the avatar of each of the one or more users may be controlled based on the type of access rights assigned to the avatar of the one or more users.

By way of an example, suppose the premise 'P' may correspond to an auditorium where a business conference is being held. As represented via the present FIG. 9, the avatar of the one or more users may be present within the premise 'P'. Further, the one or more zones within the premise 'P' may correspond to a speaker's platform zone 902, i.e., a stage, and an audience seating zone 904. As depicted via the present FIG. 9, the avatar of the one or more users may access the speaker's platform zone 902 and the audience seating zone 904 based on the type of access rights permitted to the avatar. Further, in order to control the movement of the avatar of each of the one or more users in the premise 'P', the metaverse scanner 906 (e.g., a virtual Closed-Circuit Television (CCTV) camera) may be used.

By way of an example, consider a scenario, where an avatar 'S1' of a user may be permitted to access the premise 'P' for an allotted time-period of 2 hours. Further, the avatar 'S1' of the user may be permitted to access the speaker's platform zone 902 within the premise 'P' for a time-period of 30 minutes. Additionally, the avatar 'S1' of the user may be allowed to speak (i.e., an action permitted to avatar) for 30 minutes when on the speaker's platform zone 902. Then, based on the type of access rights permitted to the avatar 'S1', the access of the premise 'P' may be provided to the avatar. Further, the avatar 'S1' may be continuously monitored by the metaverse scanner 906 to control movement of the avatar 'S1' within the one or more zones of the premise 'P' based on the type of access rights. For example, based on the type of access rights permitted to the avatar 'S1', the avatar 'S1' may be permitted within the premise 'P' for 2 hours. In current scenario, based on monitoring of the avatar 'S1', if the avatar 'S1' of the user does not leave the premise 'P' after the time-period of 2 hours, then the avatar 'S1' of the user may be tele ported outside of the premise 'P' by a metaverse accessing device (same as the metaverse accessing device 802). Similarly, in some embodiment, when the avatar 'S1' completes the time-period of 30 minutes in the speaker's platform zone 902 that was permitted to the avatar 'S1' to give speech, then the avatar 'S1' may leave the speakers platform zone 902 himself or may be tele ported by the metaverse accessing device to the audience seating zone 904 for remaining 1.5 hours permitted to the avatar 'S1'.

In another scenario, based on the type of access rights defined for the avatar of one or more users denoted as 'A1', the avatar of the one or more users 'A1' may be permitted to only access the audience seating zone 904 and may be not allowed to access the speaker's platform zone 902. Moreover, as represented via the present FIG. 9, the avatar of the one or more users 'A1' may not be allowed to speak while the avatar 'S1' of the user may be giving speech. In order to stop the avatar of the one or more users 'A1' from speaking, the metaverse accessing device may mute the avatar of the one or more users 'A1', as represented via a mute icon. In some another scenario, suppose an avatar 'A2' of a user may be permitted within the audience seating zone 904, but somehow may reach the speaker's platform zone 902. In such scenario, based on monitoring of the premise 'P' by the metaverse scanner 906, the avatar 'A2' of the user may be teleported from the speaker's platform zone 902 (i.e., an unauthorized zone) back to the audience seating zone 904. The teleporting of the avatar back to the audience seating zone 904 may be done by the metaverse accessing device.

Various embodiments provide method and system for securing metaverse premises using Non-Fungible Tokens (NFTs). The disclosed method and system may receive an access request corresponding to at least one of a plurality of premises, from an avatar of a user. It should be noted that, a Non-Fungible Token (NFT) may be pre-assigned to the avatar. In addition, the NFT may include a metadata associated with the avatar. The metadata may include an encrypted NFT public key associated with the avatar. Further, the disclosed method and system may retrieve the metadata associated with the avatar of the user based on the NFT, upon receiving the access request. In addition, the disclosed method and system may validate the access request received from the avatar based on the metadata. Further, to validate the access request, the disclosed method and system may scan, via a metadata scanner, the metadata associated with the avatar to verify information associated with the avatar based on the NFT. Thereafter, the disclosed method and system may provide an access of the at least one of the plurality of premises to the avatar upon validating the access request based on a type of access rights permitted to the avatar for the at least one of the plurality of premises.

The disclosed method and system may provide some advantages like, the disclosed method and system may provide an automated way to control access of virtual metaverse premises (i.e., the plurality of metaverse premises) and metaverse sub-premises (i.e., a set of zones within each of the plurality of premises) by an avatar of a plurality of users. In addition, the discloses method and system may control the set of actions performed by the avatar of each of the plurality of users within each of the set of zones of each of the plurality of premises. Further, the disclosed method and system may help in managing the avatar of rogue users from disrupting events happening in the plurality of premises, thereby preventing anti-social behavior of rogue users in the plurality of premises by authenticating the avatar of each of the plurality of users before entering the requested premise.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims.

Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for securing metaverse premises using Non-Fungible Tokens (NFTs), the method comprising:

receiving, by a metaverse accessing device, an access request corresponding to at least one of a plurality of premises, from an avatar of a user, wherein a Non-Fungible Token (NFT) is pre-assigned to the avatar, and wherein the NFT comprises a metadata associated with the avatar, and wherein the metadata comprises an encrypted NFT public key associated with the avatar;

upon receiving the access request, retrieving, by the metaverse accessing device, the metadata associated with the avatar of the user based on the NFT;

validating, by the metaverse accessing device, the access request received from the avatar based on the metadata, wherein validating comprises:

scanning, via a metadata scanner communicatively coupled with the metaverse accessing device, the metadata associated with the avatar to verify information associated with the avatar based on the NFT;

providing, by the metaverse accessing device, an access of the at least one of the plurality of premises to the avatar upon validating the access request based on a type of access rights permitted to the avatar for the at least one of the plurality of premises, wherein the type of access rights comprises a time-period allotted for accessing the at least one of the plurality of premises present within the metaverse, a time-period allotted for accessing one or more zones within the at least one of the plurality of premises, and a set of actions allowed to the avatar in the one or more zones; and continuously monitoring the at least one of the plurality of premises to prohibit the avatar from accessing a set of unauthorized zones present within the at least one of the plurality of premises.

2. The method of claim 1, wherein the NFT is pre-stored in an NFT wallet of the user, and wherein the metadata associated with the avatar is mapped to the NFT in database.

3. The method of claim 1, wherein validating the access request further comprises:

comparing information obtained from the access request with the information pre-stored in the metadata associated with the avatar, wherein the obtained information comprises user information, the avatar associated with the user, and the NFT pre-assigned to the avatar.

4. The method of claim 1, wherein continuously monitoring comprises:

controlling movement of the avatar in the one or more zones within the at least one of the plurality of premises based on the type of access rights assigned to the avatar.

5. The method of claim 2, further comprising assigning the NFT to the avatar of the user, wherein assigning comprises:

prompting the user to import the avatar, wherein the imported avatar will be used by the user to access one or more premises from the plurality of premises;

defining the type of access rights for the avatar of the user to access the one or more premises;

creating the metadata by associating the type of access rights with the one or more premises;

encrypting the metadata created for the avatar by adding the encrypted NFT public key based on an encryption technique;

embedding the encrypted metadata into the avatar imported by the user;

assigning the NFT to the avatar using the avatar and the encrypted metadata associated with the avatar; and storing the NFT assigned to the avatar in the NFT wallet, and the encrypted metadata associated with the avatar in the database.

6. The method of claim 5, wherein the NFT is assigned to the avatar upon receiving an authentication for the one or more premises from the plurality of premises, from the user of the avatar.

7. A system for securing metaverse premises using Non-Fungible Tokens (NFTs), the system comprising:

a processor; and a memory coupled to the processor, wherein the memory stores processor-executable instructions, which, on execution, causes the processor to:

receive an access request corresponding to at least one of a plurality of premises, from an avatar of a user, wherein a Non-Fungible Token (NFT) is pre-assigned to the avatar, and wherein the NFT comprises a metadata associated with the avatar, and wherein the metadata comprises an encrypted NFT public key associated with the avatar;

upon receiving the access request, retrieve the metadata associated with the avatar of the user based on the NFT;

validate the access request received from the avatar based on the metadata, wherein validating comprises:

scan, via a metadata scanner, the metadata associated with the avatar to verify information associated with the avatar based on the NFT;

provide an access of the at least one of the plurality of premises to the avatar upon validating the access request based on a type of access rights permitted to the avatar for the at least one of the plurality of premises, wherein the type of access rights comprises a time-period allotted for accessing the at least one of the plurality of premises present within the metaverse, a time-period allotted for accessing one or more zones within the at least one of the plurality of premises, and a set of actions allowed to the avatar in the one or more zones; and continuously monitor the at least one of the plurality of premises to prohibit the avatar from accessing a set of unauthorized zones present within the at least one of the plurality of premises.

8. The system of claim 7, wherein the NFT is pre-stored in an NFT wallet of the user, and wherein the metadata associated with the avatar is mapped to the NFT in a database.

9. The system of claim 7, wherein, to validate the access request, the processor-executable instructions further cause the processor to compare information obtained from the access request with the information pre-stored in the metadata associated with the avatar, wherein the obtained information comprises user information, the avatar associated with the user, and the NFT pre-assigned to the avatar.

10. The system of claim 7, wherein, to continuously monitor, the processor-executable instructions further cause the processor to:

control movement of the avatar in the one or more zones within the at least one of the plurality of premises based on the type of access rights assigned to the avatar.

11. The system of claim 8, wherein the processor-executable instructions further cause the processor to assign the NFT to the avatar of the user, and wherein, to assign the NFT, the processor-executable instructions further cause the processor to:

prompt the user to import the avatar, wherein the imported avatar will be used by the user to access one or more premises from the plurality of premises;

define the type of access rights for the avatar of the user to access the one or more premises;

create the metadata by associating the type of access rights with the one or more premises;

encrypt the metadata created for the avatar by adding the encrypted NFT public key based on an encryption technique;

embed the encrypted metadata into the avatar imported by the user;

assign the NFT to the avatar using the avatar and the encrypted metadata associated with the avatar; and store the NFT assigned to the avatar in the NFT wallet, and the encrypted metadata associated with the avatar in the database.

12. The system of claim 11, wherein the NFT is assigned to the avatar upon receiving an authentication for the one or more premises from the plurality of premises, from the user of the avatar.

13. A non-transitory computer-readable medium storing computer-executable instructions for securing metaverse premises using Non-Fungible Tokens (NFTs), the stored instructions, when executed by a processor, cause the processor to perform operations comprises:

receiving an access request corresponding to at least one of a plurality of premises, from an avatar of a user, wherein a Non-Fungible Token (NFT) is pre-assigned to the avatar, and wherein the NFT comprises a metadata associated with the avatar, and wherein the metadata comprises an encrypted NFT public key associated with the avatar;

upon receiving the access request, retrieving the metadata associated with the avatar of the user based on the NFT;

validating the access request received from the avatar based on the metadata, wherein validating comprises:

scanning the metadata associated with the avatar to verify information associated with the avatar based on the NFT;

providing an access of the at least one of the plurality of premises to the avatar upon validating the access request based on a type of access rights permitted to the avatar for the at least one of the plurality of premises, wherein the type of access rights comprises a time-period allotted for accessing the at least one of the plurality of premises present within the metaverse, a time-period allotted for accessing one or more zones within the at least one of the plurality of premises, and a set of actions allowed to the avatar in the one or more zones; and continuously monitoring the at least one of the plurality of premises to prohibit the avatar from accessing a set of unauthorized zones present within the at least one of the plurality of premises.

* * * * *